3,291,784
POLYMERISATION OF ETHYLENE IN THE PRESENCE OF ALUMINUM TRIMETHYL AND TITANIUM-TRICHLORIDE WHICH HAS BEEN MIXED ONE MINUTE PRIOR TO INJECTION INTO THE REACTOR
Frank Bebbington and John Brewster Rose, St. Albans, England, assignors to Imperial Chemical Industries Limited, London, England, a corporation of Great Britain
No Drawing. Filed Apr. 26, 1963, Ser. No. 276,078
Claims priority, application Great Britain, May 2, 1962, 16,855/62
5 Claims. (Cl. 260—94.9)

This invention relates to the polymerisation of ethylene.

The polymerisation of ethylene at high pressures, generally above 500 atmospheres, by means of free radical catalysts is a well established process, and catalysts have more recently been discovered which will polymerise ethylene at atmospheric pressure. The polythene produced at such lower pressure has a higher density than the polythene produced in the older high pressure processes. U.K. specification No. 799,392 describes catalysts formed by mixing aluminum trialkyls, particularly those in which the alkyl groups contain from 2 to 12 carbon atoms, with compounds from Groups IV—VI of the Periodic Table; these catalysts are suitable for use at atmospheric pressure, but it is stated that the action of the catalysts remains basically the same when the pressure is increased to any degree technically possible. However, these catalysts generally form insoluble precipitates; these are difficult to disperse in a high pressure reactor, and it has not been found possible to use them in continuous processes at high pressures since it is too difficult to handle suspensions of solids in liquids under high pressures, pipes are clogged, and the injection mechanism may be damaged by abrasion.

It is an object of the present invention to provide a convenient process for the polymerisation of ethylene at high pressures to polythene of high density: that is, to polythene having a specific density greater than 0.935 at 20° C.

According to the present invention we provide a process for the polymerisation of ethylene that comprises contacting ethylene at a pressure above 450 atmospheres with a catalyst comprising the product of reaction of aluminium trimethyl with titanium tetrachloride.

It is a particular feature of our invention to carry out the polymerisation continuously. The advantage of the catalyst combination we use is that the reaction of aluminium trimethyl with titanium tetrachloride does not immediately produce a precipitate, and may thus be injected into a reactor in fluid form. Further, when injected into the reactor, it is more readily dispersed throughout the reaction mass.

Preparation of the catalyst is carried out by mixing the two components before injection into the ethylene polymerisation reactor, in the presence or absence of a hydrocarbon diluent. If the components are mixed too soon before injection, a precipitate may begin to form before the time comes to inject the catalyst, with the disadvantages previously outlined. The catalyst is suitably mixed by supplying the components, or solutions thereof, separately to a screw press or other pump in which they are mixed and from which they are injected into the polymerisation reactor. The catalyst is preferably introduced into the reactor within one minute of mixing. Injection of a catalyst mixture containing no hydrocarbon diluent requires more careful control than when a diluent is present, because of the higher concentration of the catalyst, but has the advantage that the polythene produced is not contaminated with the lower boiling hydrocarbon, and a possible disadvantage in subsequent processing is avoided. The catalyst is decomposed by oxygen and water, so that it is necessary to prepare it in the absence of air and moisture, or in the presence of only limited amounts of them.

The polymerisation may be carried out by any of the processes known for the polymerisation of ethylene at high pressure. It may be operated as a batch reaction in a pressure resistant vessel, but, as previously stated, the particular advantage of the catalyst used is that it can conveniently be introduced into continuous reactions of the type normally used in the commercial manufacture of polythene. Such continuous reactions may be carried out either in a stirred autoclave, or in a tubular reactor of relatively great length to cross section, the catalyst in either case being introduced at one or more points.

The reaction mixture, containing polymer and unconverted ethylene, is passed from the reactor through a pressure let-down valve to a separator, where ethylene is separated from the polymer and may be returned to the feed gas. The polymer may be conveyed to an extruder and converted to granules or other desired form.

The molecular weight, density, flow characteristics and other properties of the product depend largely on the reaction conditions of temperature and pressure, and the presence or absence of modifying agents, for example co-monomers and chain transfer agents. Normally, the polymerisation conditions of temperature and pressure are chosen to give a desired product, and the proportion of catalyst to ethylene introduced into the reaction is controlled to maintain the desired temperature or temperature range in the exothermic reaction, heat transfer being accomplished largely by the cool incoming gas in the autoclave reactor, or, in the tubular reactor, by removal of heat through the wall. The temperature of the reaction is preferably not allowed to exceed 100° C.; reaction temperatures of 30° to 80° C. are preferred for economic reasons, the reaction being somewhat slow at temperatures below 30° C. and efficiency of the catalyst being lost at temperatures above 80° C. When the reaction is carried out in a stirred autoclave, the ethylene supplied to the reactor may if necessary be refrigerated to provide adequate cooling.

Because of the comparatively low temperatures used in the process of the invention, the polymer produced tends to have an undesirably high molecular weight and hence a low melt flow index and poor processability. This disadvantage can be overcome by carrying out the polymerisation reaction in the presence of a chain transfer agent, to reduce the molecular weight of the polymer produced; hydrogen is a suitable chain transfer agent for use under the preferred reaction conditions.

Separation of the catalyst residues from the polythene produced may be carried out, if desired, by washing the polymer with a suitable complex-forming reagent, such as an alcohol, ketone or diketone, or a mixture of these. The metal residues react with the reagent to form complexes, which may be washed out with any diluent they are soluble in, for example a hydrocarbon or more of the complex-forming agent itself. It is however, a particular feature of our invention that the conversion obtained (or moles ethylene polymerised per mole of catalyst) is, under suitable conditions, so high that there is no need to remove catalyst residues for many applications of the product.

The advantages provided by the present invention, apart from those already mentioned, include that of enabling the high pressure polythene manufacturer to add greatly to his range of polythenes without the need to introduce specialised plant and equipment for making the higher ensity product. This is an important advantage, since the lower density products produced by the conventional high pressure processes are still preferred for many applications, and flexibility in manufacture, to meet a demand both for these polymers and for the higher density polymers more recently introduced, is desirable.

In the following examples, which illustrate but in no way limit our invention, the use of the catalyst injected into a batch reaction is described. It will be appreciated that the catalyst may with equal ease be injected into a continuous polymerisation process conducted in a manner known to the art.

*Example 1*

A 300 cc. capacity, stirred, high pressure autoclave was charged with dry, oxygen-free ethylene to a pressure of 450 atmospheres, and warmed to 30° C. When the desired conditions of pressure and temperature had been obtained solutions of aluminium trimethyl (0.1 millimole/cc.) and titanium tetrachloride (0.1 millimole/cc.) in n-heptane were mixed in equal volumes at the point of entry to a screw press, from which the mixture was then injected into the autoclave. 32 cc. of this mixture were injected over a period of 69 minutes during which time the pressure was maintained at 450–600 atmospheres and the temperature at 30°–65° C. After the autoclave had been cooled and the presure released, 79 g. of solid polymer were removed. The polymer had a density of 0.940 at 20° C.

*Example 2*

The process of Example 1 was repeated using solutions of aluminium trimethyl (0.15 millimole/cc.) and titanium tetrachloride (0.018 millimole/cc.) in petroleum ether. 18 cc. of this mixture were injected into the autoclave over a period of 3 hours. The pressure was maintained at 890–1200 atmospheres and the temperature at 16°–32° C. 45 g. solid polymer (density 0.960 at 20° C.) were produced.

*Example 3*

The process of Example 1 was repeated using solutions of aluminium trimethyl (0.15 millimole/cc.) and titanium tetrachloride (0.026 millimole/cc.) in petroleum ether. 12.5 cc. of this mixture were injected into the autoclave over a period of 34 minutes. The pressure was maintained at 950–1000 atmospheres and the temperature at 68°–79° C. 15 g. solid polymer (density 0.962 at 20° C.) were produced.

*Example 4*

The process of Example 1 was repeated using solutions of aluminium trimethyl (0.14 millimole/cc.) and titanium tetrachloride (0.016 millimole/cc.) in a high-boiling petrol fraction. 24 cc. of this mixture were injected into the autoclave over a period of 36 minutes. The pressure was maintained at 1750–2150 atmospheres and the temperature at 30°–110° C. 42 g. solid polymer (density 0.960 at 20° C.) were produced.

We claim:
1. Process for the homopolymerization of ethylene which comprises contacting ethylene with a polymerization catalyst in a polymerization reactor at a pressure above 450 atmospheres and a temperature not exceeding 100° C., and recovering solid polyethylene, said polymerization catalyst having been prepared by mixing titanium tetrachloride with aluminum trimethyl within one minute prior to introduction into said polymerization reactor.

2. Process according to claim 1 wherein said polymerization catalyst is introduced into said polymerization reactor together with an inert hydrocarbon diluent.

3. A continuous process for the homopolymerization of ethylene comprising continuously passing ethylene into a reaction zone under a pressure of between 450 atmospheres and about 2,000 atmospheres and at a temperature not exceeding 100° C., at least intermittently injecting into said reaction zone a polymerization catalyst prepared by mixing titanium tetrachloride with aluminum trimethyl within one minute prior to the introduction of the polymerization catalyst into the reaction zone, and continuously recovering solid polymer from said reaction zone.

4. Process according to claim 3 wherein the temperature in the reaction zone is between 30 and 80° C.

5. Process for the homopolymerization of ethylene, comprising contacting ethylene in a polymerization reactor at a pressure of above 450 atmospheres and a temperature between 30 and about 100° C. in the presence of hydrogen as a chain transfer agent with a polymerization catalyst prepared by mixing titanium tetrachloride with aluminum trimethyl within one minute prior to the introduction of the polymerization catalyst into the polymerization reactor, and subsequently recovering solid polymer from the polymerization reactor.

References Cited by the Examiner

UNITED STATES PATENTS 3,012,023  12/1961  Anderson et al. _____ 260—94.9
3,051,690   8/1962  Vandenberg _____ 260—94.9

OTHER REFERENCES

Sittig: Polyolefin Resin Processes, Gulf Publishing Co., Houston, Tex. (1961), page 118 relied on.

JOSEPH L. SCHOFER, *Primary Examiner.*

M. B. KURTZMAN, *Assistant Examiner.*